US007249757B2

(12) United States Patent
Ozawa et al.

(10) Patent No.: US 7,249,757 B2
(45) Date of Patent: Jul. 31, 2007

(54) BRUSH TYPE SMALL MOTOR HAVING NON-LINEAR SPRING DEVICE

(75) Inventors: Nobuhiro Ozawa, Nagano (JP); Takeshi Kirihara, Nagano (JP); Shinji Ikeda, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/666,047

(22) Filed: Sep. 18, 2003

(65) Prior Publication Data

US 2004/0061412 A1 Apr. 1, 2004

(30) Foreign Application Priority Data

Sep. 26, 2002 (JP) ............................ 2002-280423
Sep. 26, 2002 (JP) ............................ 2002-280424

(51) Int. Cl.
*F16F 3/04* (2006.01)

(52) U.S. Cl. ....................... 267/196; 267/170; 267/174

(58) Field of Classification Search .................. 267/33, 267/170, 174–179, 190, 202, 209, 216, 196
See application file for complete search history.

(56) References Cited

U.S. PATENT DOCUMENTS

| | | | | |
|---|---|---|---|---|
| 1,095,821 A * | 5/1914 | Crawford | 152/97 |
| 2,055,242 A * | 9/1936 | Smith | 267/202 |
| 2,848,216 A * | 8/1958 | McGurk | 267/176 |
| 3,039,757 A * | 6/1962 | Barr | 267/140 |
| 3,750,238 A * | 8/1973 | Tanner | 267/176 |
| 3,856,285 A * | 12/1974 | Yamada | 267/202 |
| 5,062,619 A * | 11/1991 | Sato | 267/154 |
| 5,092,568 A * | 3/1992 | Tachikawa et al. | 267/179 |
| 5,529,327 A * | 6/1996 | Huang | 280/276 |
| 5,622,358 A * | 4/1997 | Komura et al. | 267/166 |
| 6,193,225 B1 * | 2/2001 | Watanabe | 267/180 |
| 6,328,294 B1 * | 12/2001 | Palinkas | 267/153 |
| 2002/0113352 A1 * | 8/2002 | Edwards | 267/166 |

FOREIGN PATENT DOCUMENTS

| | | |
|---|---|---|
| JP | 27472/1986 | 2/1986 |
| JP | 05184104 A | 7/1993 |
| JP | 09021440 A | 1/1997 |
| JP | 10-174401 A | 6/1998 |
| JP | 11018374 A | 1/1999 |
| JP | 2000184666 A | 6/2000 |

* cited by examiner

*Primary Examiner*—Christopher P. Schwartz
(74) *Attorney, Agent, or Firm*—Boyle Fredrickson Newholm Stein & Gratz S.C.

(57) ABSTRACT

A spring device consists of a coil spring case formed of right, left, back and front side plates and a spring receiving plate, a coil spring having a liner spring property, and a spring urging member for urging the coil spring into the coil spring case. A distance between the right and left side plates of the spring case is set a little larger than an outer diameter of the coil spring. A distance between the back and front side pates of the spring case is set about 1.5 to 2 times larger than the outer diameter of the coil spring, and a length of the spring case is set smaller than a free length of the coil spring. The coil spring is deformed and a non-linear spring property is obtained when the coil spring is urged through the spring urging member.

1 Claim, 14 Drawing Sheets

BRUSH TYPE SMALL MOTOR HAVING NON-LINEAR SPRING DEVICE

TECHNICAL FIELD

The present invention relates a brush type small motor having a non-linear spring device, and more particularly, relates to a brush type small DC motor having a coil spring as mechanical parts for use in many kinds of electric and electronic equipments or mechanical equipments, such as electric tools, domestic electrification equipments and business equipments.

BACKGROUND ART

Many kinds of coil springs having linear spring properties have been used in many kinds of electric and electronic equipments or mechanical equipments. Further, coil springs having non-linear properties have been required instead of springs having linear properties in order to optimize the performance of the equipments.

In case of a brush type small DC motor widely used in the electrical and electronic equipments, for example, a relation between a pressure applied to a brush and an abrasion rate of the brush is shown in FIG. 1. As shown in FIG. 1, an electrical abrasion due to the commutation spark is increased when the brush pressure is reduced, and a mechanical abrasion is increased when the brush pressure is increased.

In case that a coil spring having a linear spring property is used in the brush type small DC motor, the brush pressure is in the range of the mechanical abrasion at an initial stage of the motor operation, and when the abrasion of the brush is increased, the brush pressure is reduced, so that the motor is operated in the optimum range. When the abrasion of the brush is further increased, the brush pressure is reduced further, so that the motor is operated in the electric abrasion range due to the commutation spark.

When an effective portion of the brush is worn away, the service life of the small DC motor is expired.

Accordingly, it is desirable that the brush pressure is in the optimum range shown in FIG. 1 and the variation rate of the brush pressure is small practicably through the operation of the small DC motor.

An ideal spring property for reducing the brush abrasion in consideration of the abrasion of the brush is shown in FIG. 2. Specifically, in FIG. 2, the distortion of the coil spring is small in a range of from a point O to a point A. However, this range is not normally used, but a range of from the point A to a point B is actually used in the small DC motor. Loads D and E applied to the spring correspond to the coil distortions A and B, respectively. It is desirable that the variation rate of the load applied to the coil spring between the distortions A and B is small practicably. Coil elements forming the coil spring are brought into contact with one another and the load is increased rapidly, if the distortion of the coil spring is increased from the point B to a point C. It is desirable that the range of from the point B to the point C is not used practicably. Specifically, it is preferable that a coil spring for urging the brush in the small DC motor has a non-liner spring property shown in FIG. 2.

Hitherto, a coil spring having a non-linear spring property, such as a variable pitch coil spring, a conical coil spring, a hour glass shaped coil spring, or a barrel shaped coil spring etc. has been known. However, such spring is not normally used. A coil spring having an ideal spring property shown in FIG. 2 for use in the small DC motor has not yet been obtained.

A method for obtaining a coil spring having a non-linear spring property is disclosed in the publication, "Springs" Spring Technic Research Board, published from Maruzen Kabushiki Kaisha on Dec. 20, 1982, and the publication, Toshinobu Ichiki "Theory and Practice of Brush for use in Electric Machines" published from Corona Sha on Mar. 1, 1978.

One of methods for obtaining a coil spring having a non-linear spring property is a series method wherein springs are connected in series. In this method, three coil springs having different spring constants (K1, K2 and K3), for example, are connected in series as shown in FIG. 3. The total spring constant K of the combined springs is expressed by a following formula.

$$1/K=1/K1+1/K2+1/K3$$

FIG. 4 shows a relation between the distortion of the spring and the load applied to the spring having a non-linear spring property.

In the present invention, a non-linear spring device is provided by using a coil spring having a linear spring property in consideration of the method for obtaining the non-linear spring property.

FIG. 5 is a sectional view of a brush type small DC motor widely used conventionally. In FIG. 5, a reference numeral 1 denotes a motor case, and 2 denotes a permanent magnet for forming magnetic poles, provided on an inner peripheral surface of the motor case 1. A reference numeral 3 denotes a stator assembly, 4 denotes a bracket, 5 denote a brush holder for holding a brush 6 and a coil spring 7 for urging the brush 6, mounted on the bracket 4, and 8 and 9 denote motor terminals. A reference numeral 10 denotes a rotary shaft, 11 denotes an armature core, 12 denotes a winding, 13 denotes a commutator, 14 denotes a rotor assembly, and 15 and 16 denote bearings.

The brush type small DC motor is simple in construction, variable in speed, low in cost, and used widely.

FIG. 6 is a sectional view, taken along lines 6—6 of FIG. 5.

DESCLOSURE OF THE INVENTION

An object of the present invention is to provide a non-linear spring device having a linear spring for use in a brush type small DC motor, for example. The non-linear spring device serves as to reduce the variation of the load with respect to the distortion of the spring in order to prolong the service life of the brush type small DC motor.

The spring device of the present invention comprises a coil spring case formed of right, left, back and front side plates and a spring receiving plate, a coil spring having a liner spring property, and a spring urging member for urging the coil spring into the coil spring case, a distance between the right and left side plates of the spring case being set a little larger than an outer diameter of the coil spring, a distance between the back and front side pates of the spring case being set about 1.5 to 2 times larger than the outer diameter of the coil spring, and a length of the spring case being set smaller than a free length of the coil spring, wherein the coil spring is deformed and a non-linear spring property is obtained when the coil spring is urged by the spring urging member.

Another object of the present invention is to provide a brush type small DC motor with a brush urging spring device having a non-linear spring property. The brush urging spring device comprises a brush holder, a coil spring having a liner spring property inserted into the brush holder, and a brush having a connecting portion for connecting the brush and the coil spring, the brush holder being formed of side plates arranged in the upstream and downstream sides in a rotary direction of the motor, an axial side plate, a spring receiving plate, and a side surface of a bracket, a distance between the side plates of the brush holder being set a little larger than an outer diameter of the coil spring, so that the coil spring is movable freely in the brush holder, a distance between the axial side plate of the brush holder and the side surface of the bracket being set about 1.5 to 2 times larger than the outer diameter of the coil spring, and a length of the brush holder being set smaller than a free length of the coil spring, wherein the coil spring is deformed and a non-linear spring property is obtained when the coil spring is urged by the brush urging spring device.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BEST MODE FOR CARRING OUT THE INVENTION

The present invention will now be explained with reference to the drawings.

(Embodiment 1)

Figure 1:
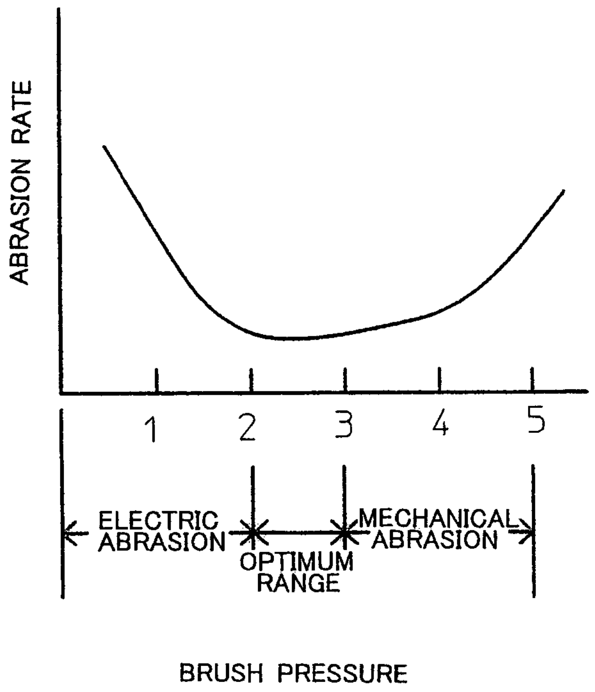
FIG. 1 is a graph showing relation between a pressure applied to a brush and an abrasion rate of the brush.
Figure 2:
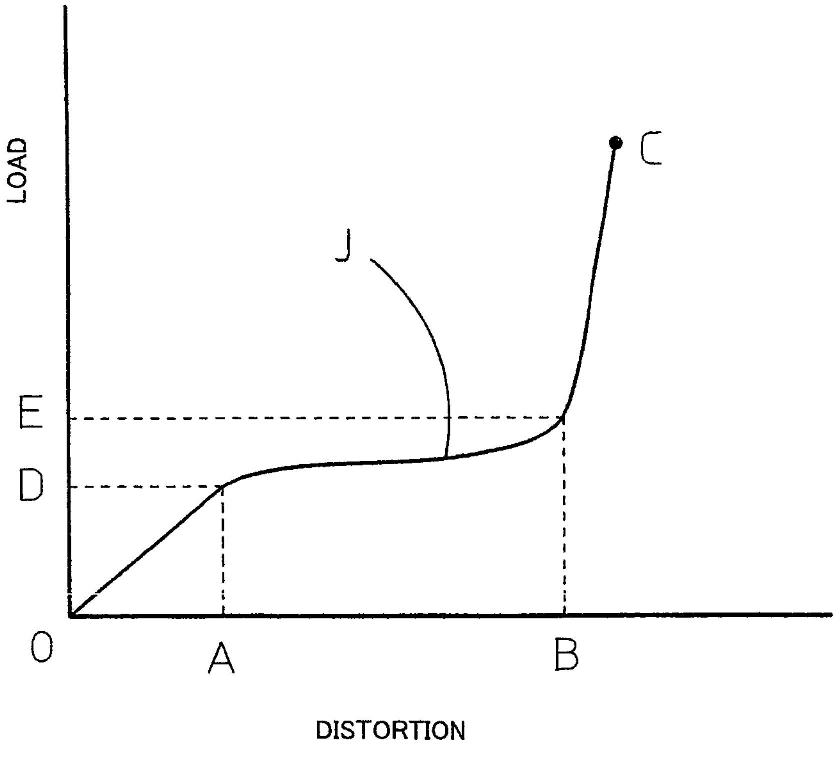
FIG. 2 is a graph showing a relation between a distortion of a spring having an ideal spring property and a load applied to the spring.
Figure 3:
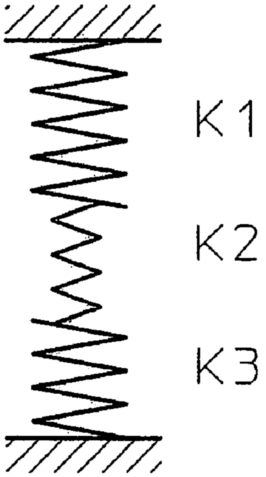
FIG. 3 shows a combined spring formed by a series method.
Figure 4:
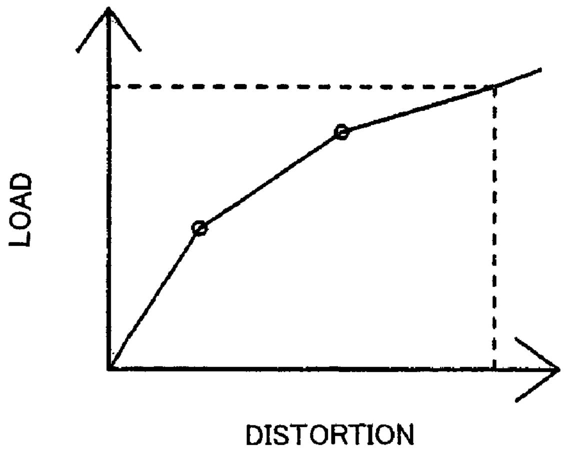
FIG. 4 is a graph showing a relation between a distortion of a spring having a non-linear spring property and load applied to the spring.
Figure 5:
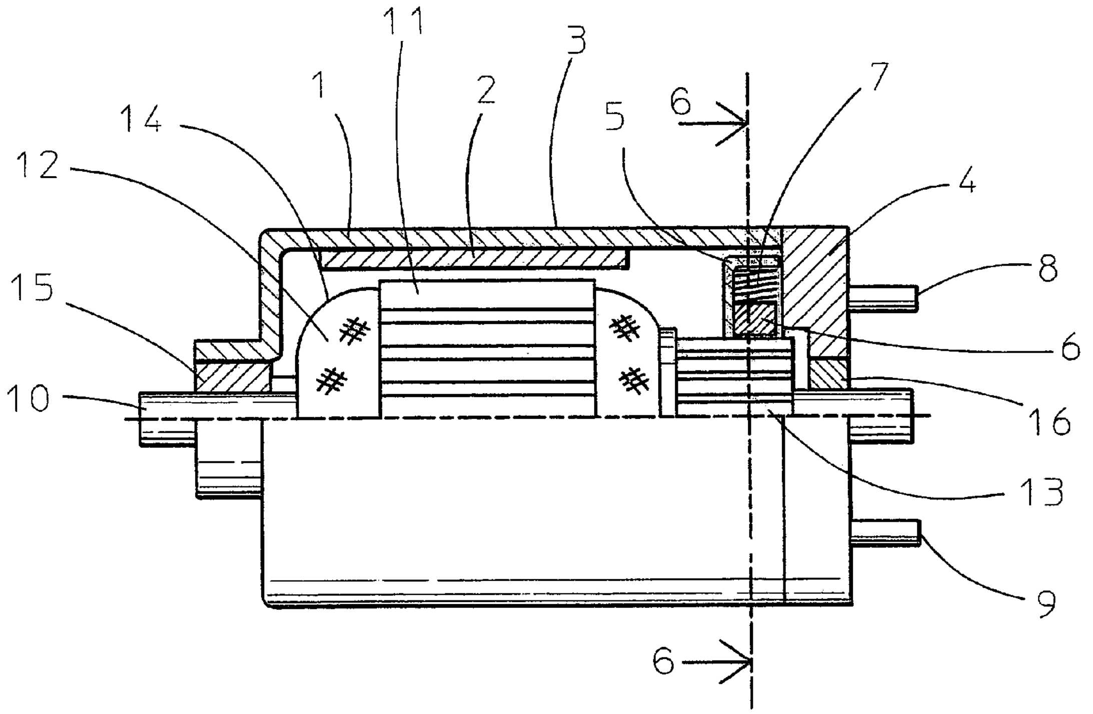
FIG. 5 is a schematic sectional view of a conventional small DC motor.
Figure 6:
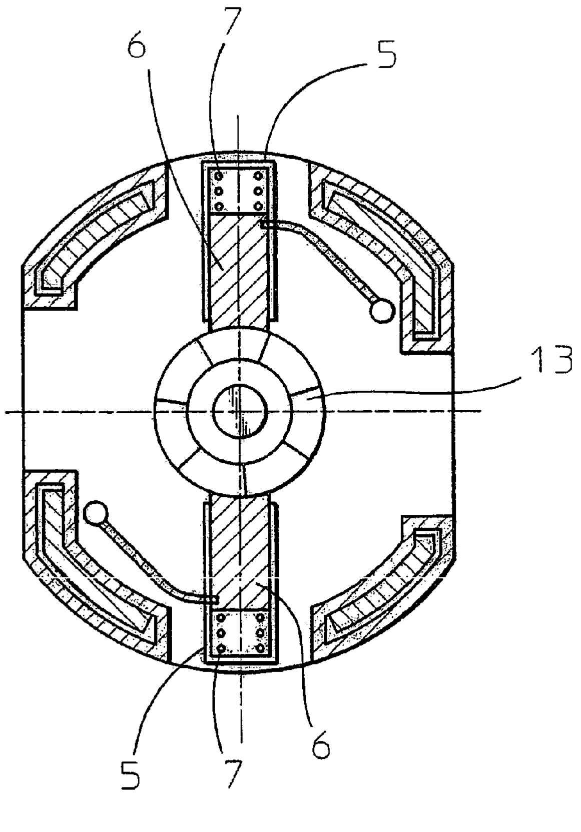
FIG. 6 is a schematic sectional view, of the conventional small DC motor, taken along lines 6—6 of FIG. 5.
Figure 7:
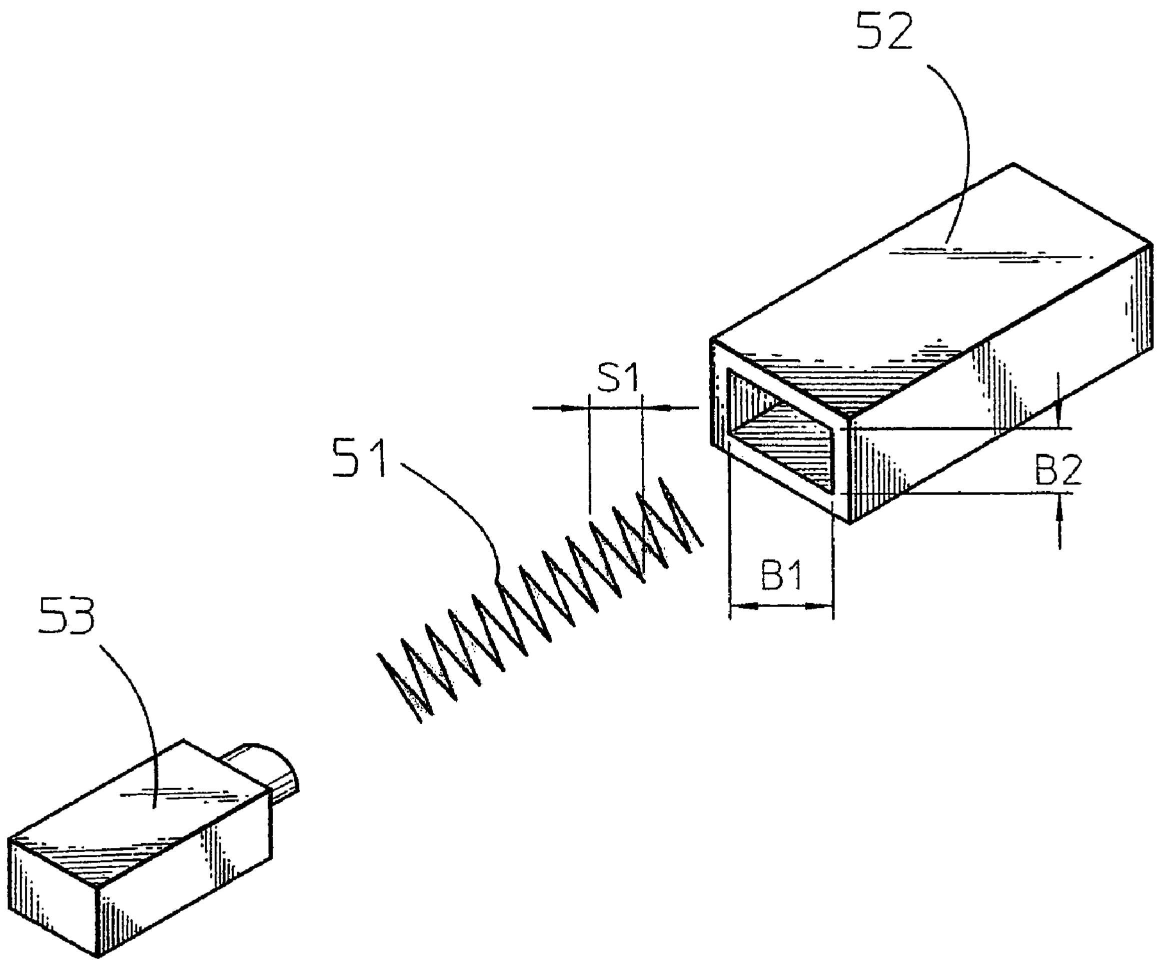
FIG. 7 is an exploded view of a non-linear spring device according to the present invention.
Figure 8:
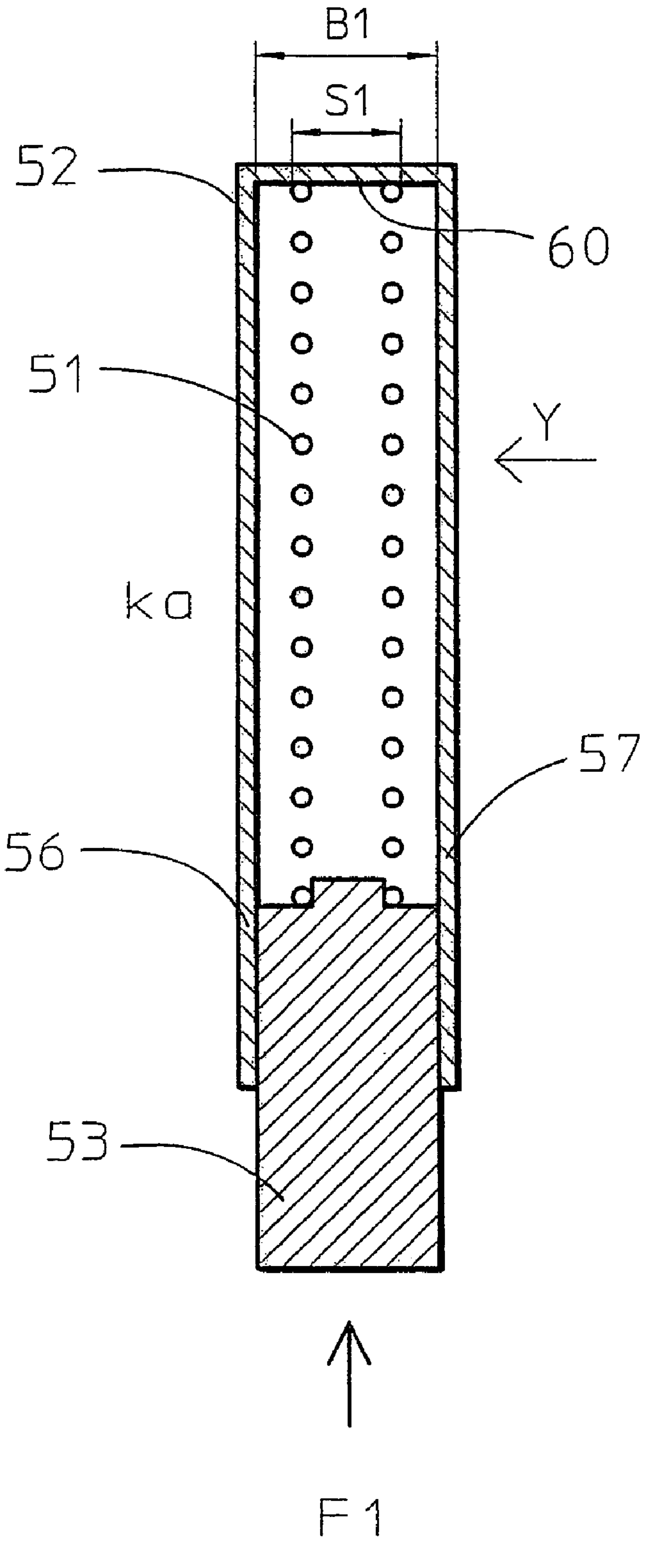
FIG. 8 is a sectional side view of the non-linear spring device shown in FIG. 7.
Figure 9:
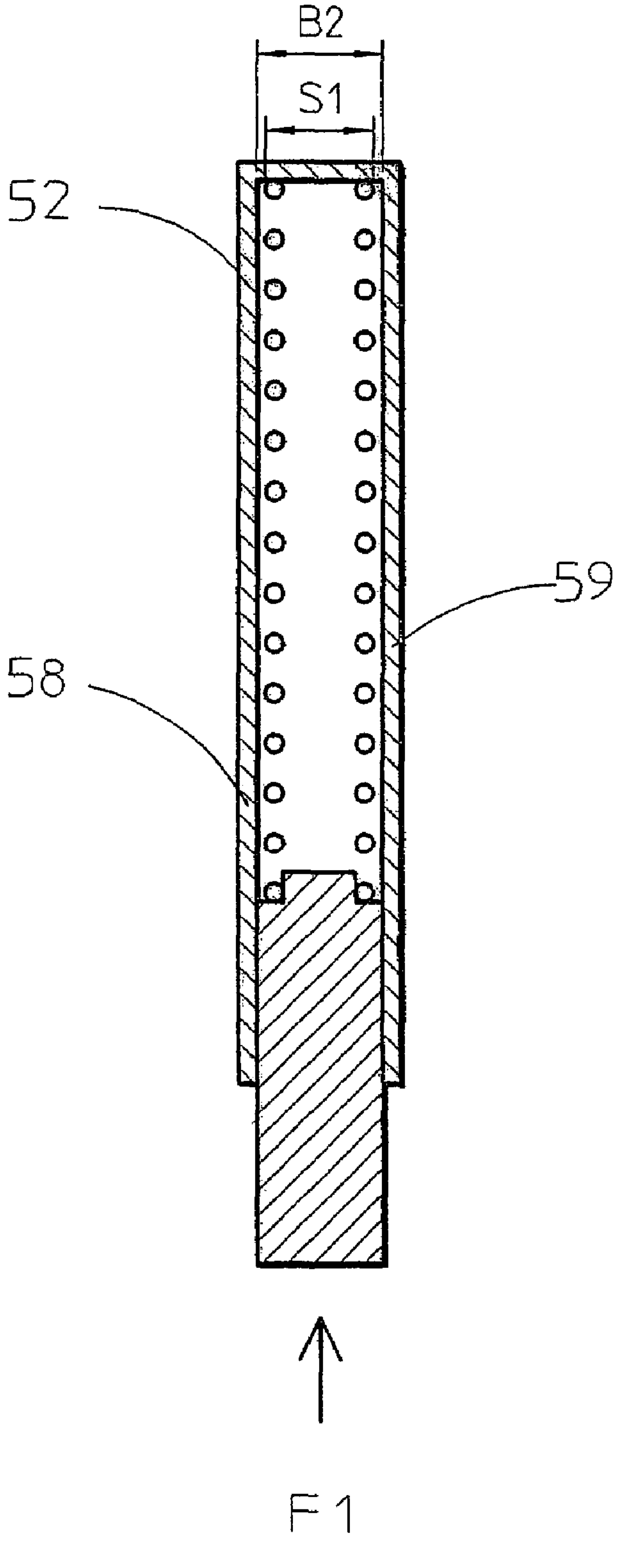
FIG. 9 is a sectional front view of the non-linear spring device shown in FIG. 8.

FIG. 7 shows a non-linear spring device of the present invention. As shown in FIG. 7, a coil spring 51 having a liner spring property is inserted into a box like coil spring case 52, and a load is applied through a spring urging member 53 to the coil spring 51. A distance B1 between right and left side plates 57 and 56 of the coil spring case 52 is set about 1.5 to 2 times larger than an outer diameter S1 of the coil spring 51 as shown in FIG. 8, and a distance B2 between back and front side plates 59 and 58 of the coil spring case 52 is set a little larger than the outer diameter S1 of the coil spring 51 as show in FIG. 9, so that the coil spring 51 can move in the coil spring case 52. As shown in FIG. 8, the coil spring 51 is inserted into the spring case 52, and a load F1 is applied to the coil spring 51 through the spring urging member 53. FIG. 9 is a cross sectional view of the non-linear spring device shown in FIG. 8 viewed in a direction of an arrow Y. As shown in FIG. 8 and FIG. 9, the coil spring 51 is apart fully from the right and left side plates 57 and 56 of the coil spring case 52, but is brought into contact with the back and front side plates 59 and 58 of the coil spring case 52, and end of the coil spring 51 is fixed to a coil receiving plate 60. A relation between a distortion of the coil spring 51 and the load F1 applied to the coil spring 51 shows a linear property as shown in a range of from a point a to a point b of a curve G shown in FIG. 10.

Figure 11:
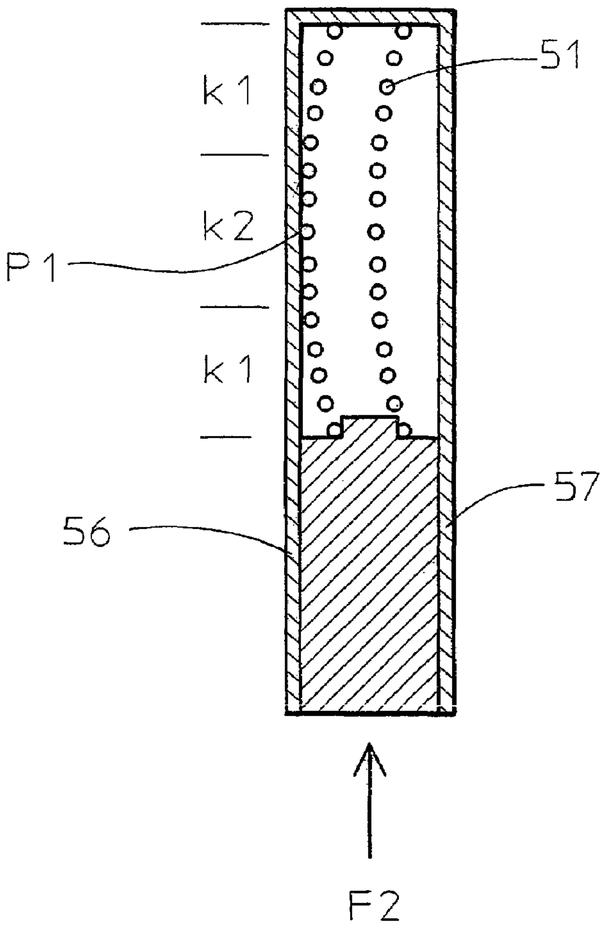
FIG. 11 is a sectional side view of the non-linear spring device.

The coil spring 51 is compressed and deformed along a curve and brought into contact with the left side plate 56 of the coil spring case 52 at a point P1 as shown in FIG. 11 when the load applying to the coil spring 51 is increased to a value F2. In this state, the distortion of each of coil elements forming the coil spring 51 is different from one another, so that the spring constant of each of the coil elements becomes different from one another. Accordingly, it is assumed that the coil spring 51 is divided into three segments, a first and a third segments each having a spring constant k1, and a second segment having a spring constant k2, for example. Thus, the total spring constant kb of the coil spring 51 can be expressed equivalently by a following formula.

$$1/kb=2/k1+1/k2$$

Figure 10:
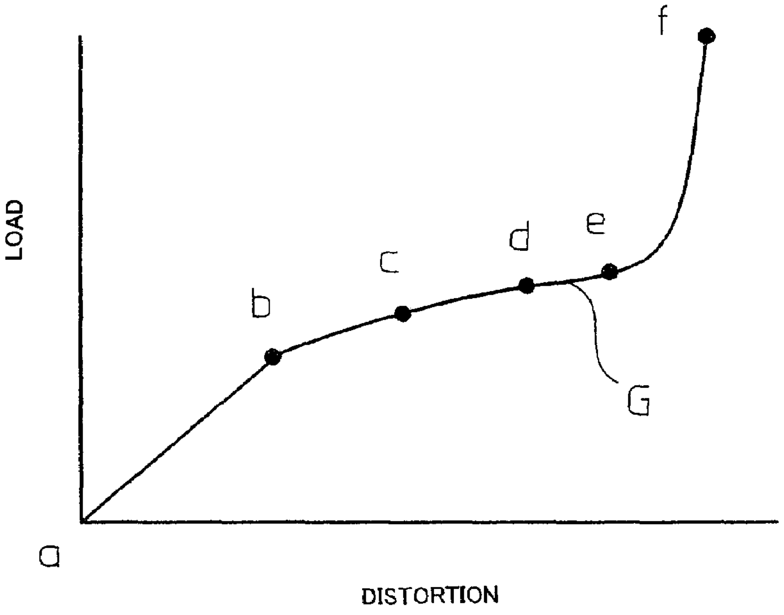
FIG. 10 is a graph showing a non-linear spring property.

In this state, the spring property is shown in a range of from the point b to a point c of the curve G shown in FIG. 10.

Figure 12:
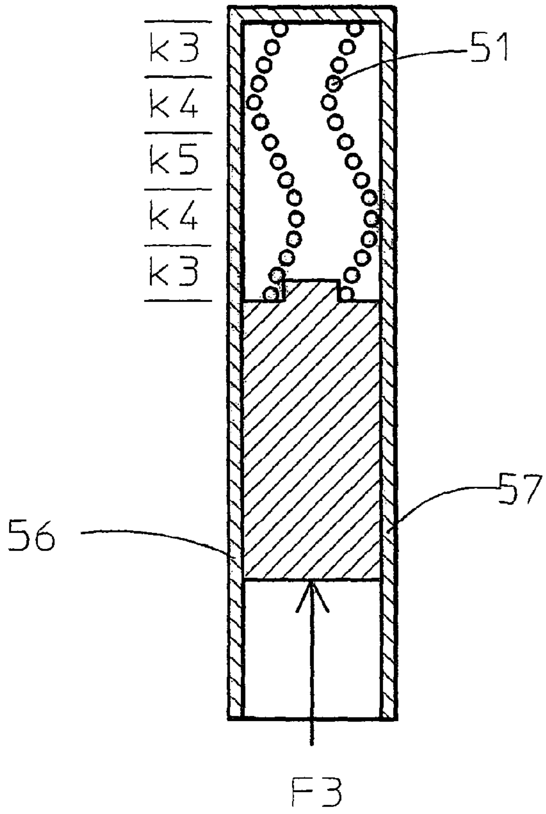
FIG. 12 is a sectional side view of the non-linear spring device.

When the load is increased to a value F3, the coil spring 51 is compressed further and deformed along a S curve, as shown in FIG. 12. In this state, it is assumed that the coil spring 51 is divided into five segments, a first and a fifth segments each having a spring constant k3, a second and a fourth segments each having a spring constant k4, and a third segment having a spring constant k5, for example. The total spring constant kc of the coil spring 51 can be expressed equivalently by a following formula.

$$1/kc=2/k3+2/k4+1/k5$$

The property of the coil spring 51 is shown in a range of from the point c to a point d of the curve G shown in FIG. 10.

Figure 13:
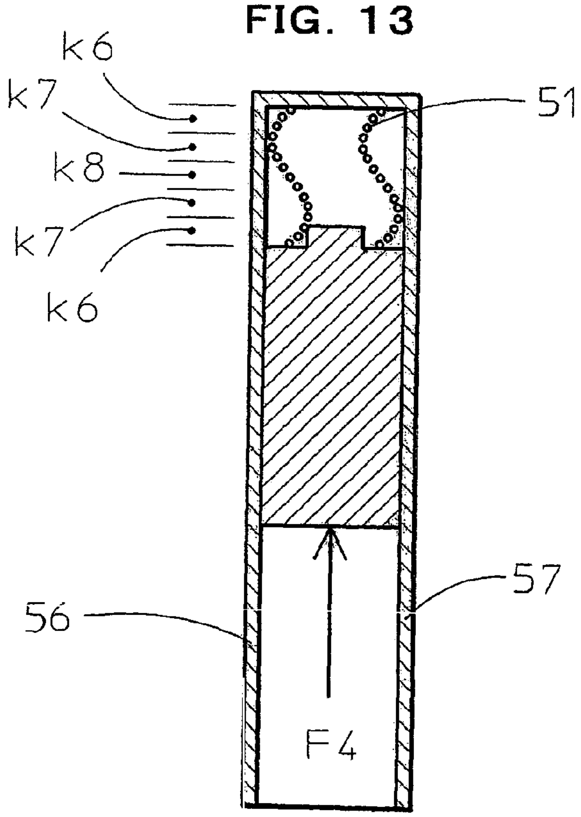
FIG. 13 is a sectional side view of the non-linear spring device.

When the load is increased further to a value F4, the coil spring 51 is further compressed as shown in FIG. 13. In this state, it is assumed that the coil spring 51 is divided into five segments, a first and a fifth segments each having a spring constant k6, a second and a fourth segments each having a spring constant k7, and a third segment having a spring constant k8, for example. The total spring constant kd of the coil spring 51 can be expressed equivalently by a following formula.

$$1/kd=2/k6+2/k7+1/k8$$

The property of the coil spring 51 is shown in a range of from the point d to a point e of the curve G shown in FIG. 10.

When the load in increased further coil elements of the coil spring 51 are brought into intimate contact with one another, and the property of the coil spring 51 is shown in a range of from the point e to a point f of the curve G shown in FIG. 10, so that the distortion of the coil spring 51 reaches to the limit.

As stated above, in the non-linear spring device of the present invention, the coil spring 51 having the liner spring property is inserted into the coil spring case 52, the distance B1 between the right and left side plates 57 and 56 of the coil spring case 52 is set larger enough than the outer diameter S1 of the coil sprig 51, and the distance B2 between back and front side plates 59 and 58 of the coil spring case 52 is set a little larger than the outer diameter S1 of the coil spring 52, so that the coil spring 52 is movable in the spring case 52, when the load is applied through the spring urging member 53 to the coil spring 51.

A friction loss may be generated when the coil spring 51 is urged forcedly to the plates 56–59 of the coil spring case 52.

(Embodiment 2)

In an embodiment 2 of the present invention, a non-linear spring device having a coil spring of linear spring property is used in a brush type small DC motor.

Figure 14:
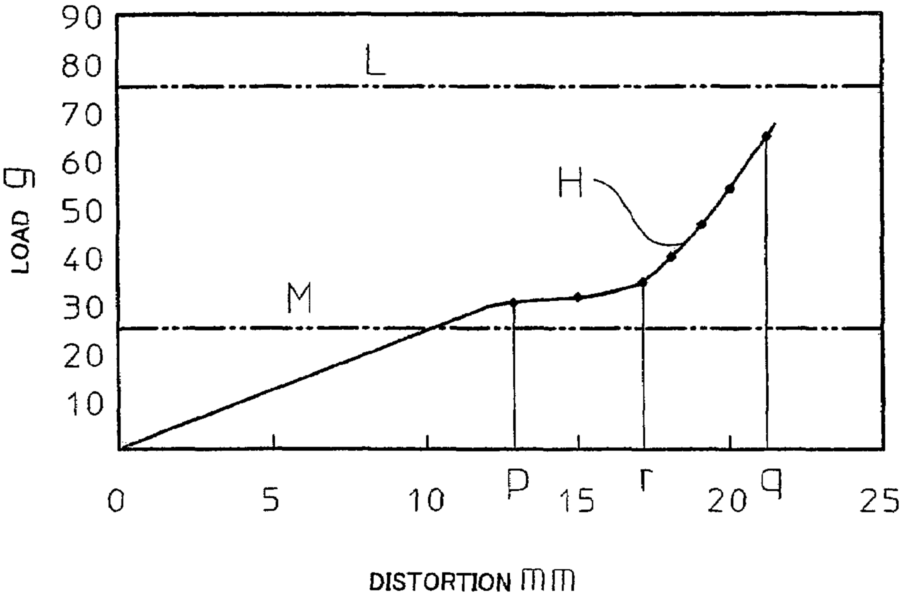
FIG. 14 is a graph showing a relation between the distortion of the non-linear spring and the load applied to the spring.

A relation between a distortion of a non-linear spring device having a coil spring of a linear spring property and a load applied to the spring is shown as a curve H shown in FIG. 14 which is similar to the curve G shown in FIG. 10. A range of from a point p to a point q of the curve H shown in FIG. 14 is used actually for the brush type small DC motor. In the curve H, the load is substantially constant in the range of from the point p to a point r, and horizontal lines L and M show a desirable range of the load to be applied to the brush type small DC motor.

Figure 15:
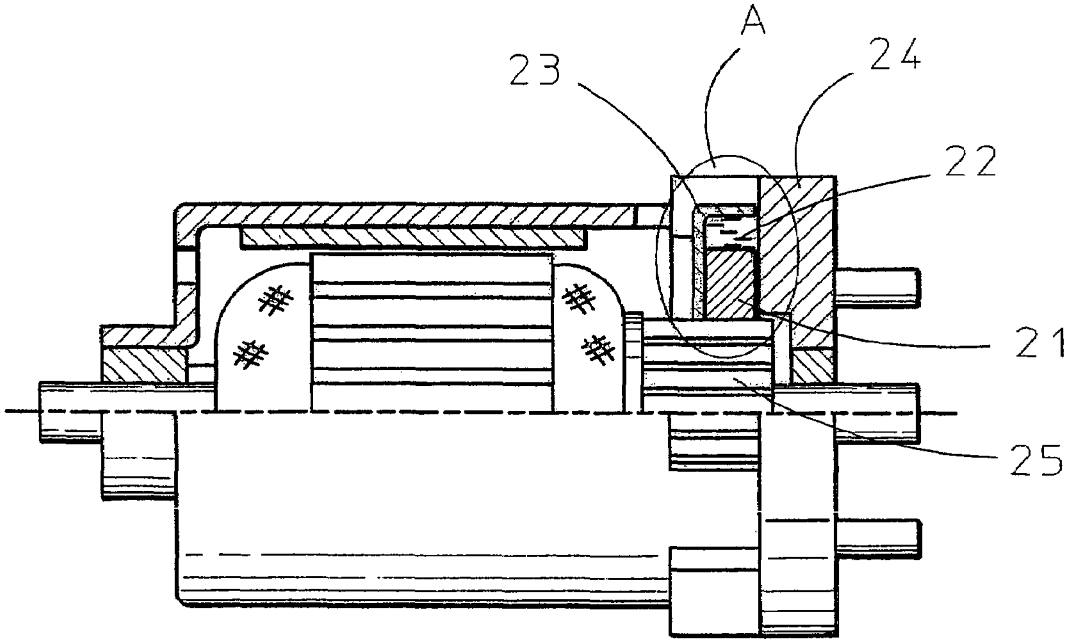
FIG. 15 is a schematic sectional view of a small DC motor according to the present invention.

FIG. 15 is a sectional view of the brush type small DC motor according to the present invention. The small DC motor comprises a brush 21, a coil spring 22 for urging the brush 21, a brush holder 23, a bracket 24, a commutator 25, a coil spring holding portion 30 and a connecting portion 31 for connecting the brush 21 to the coil spring 22.

Figure 16:
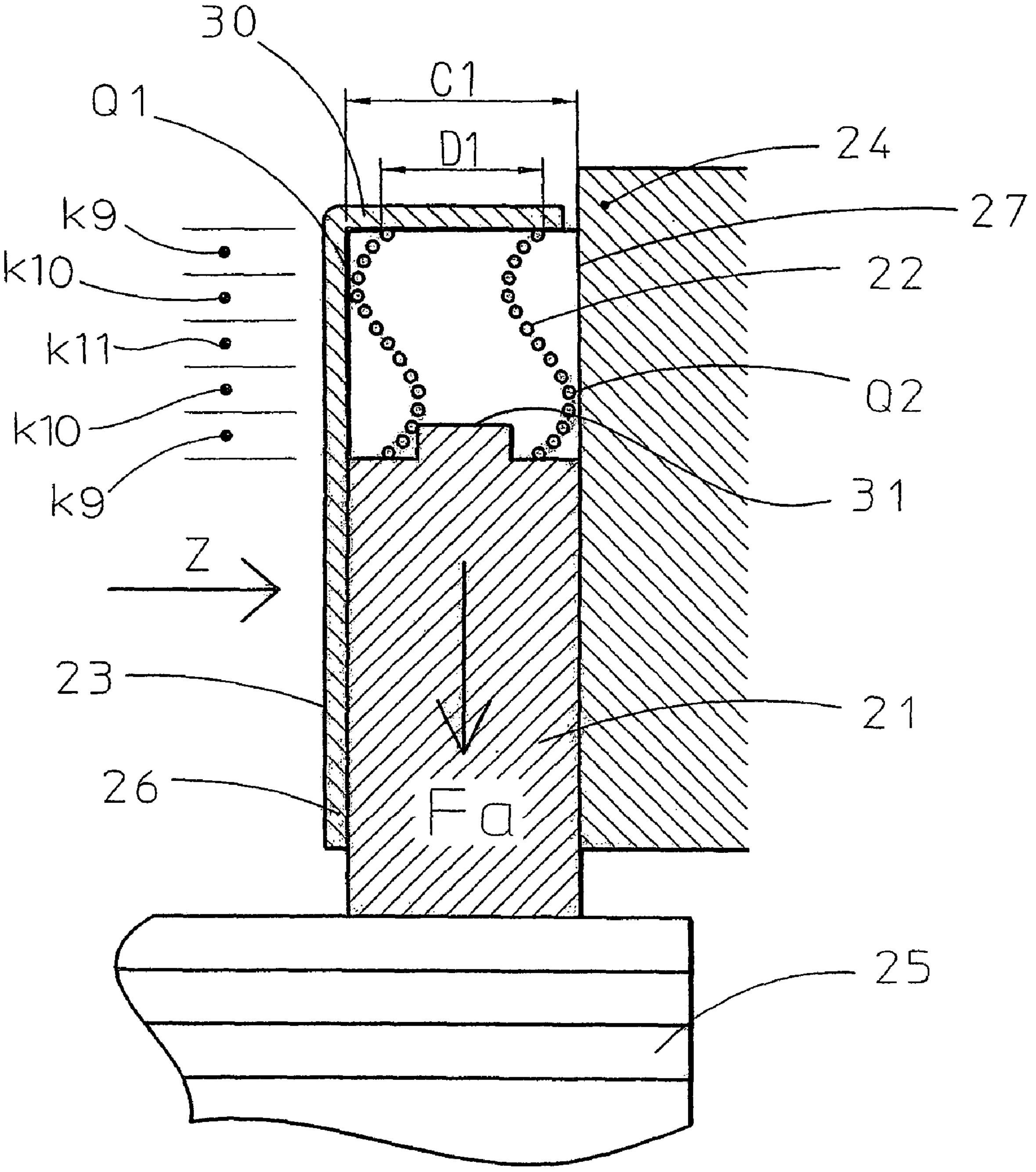
FIG. 16 is an enlarged sectional side view of a brush urging device at a portion A of the small DC motor shown in FIG. 15.

FIG. 16 is an enlarged sectional front view showing relations in position between the brush 21, the coil spring 22, the brush holder 23, the bracket 24 and the commutator 25.

Figure 17:
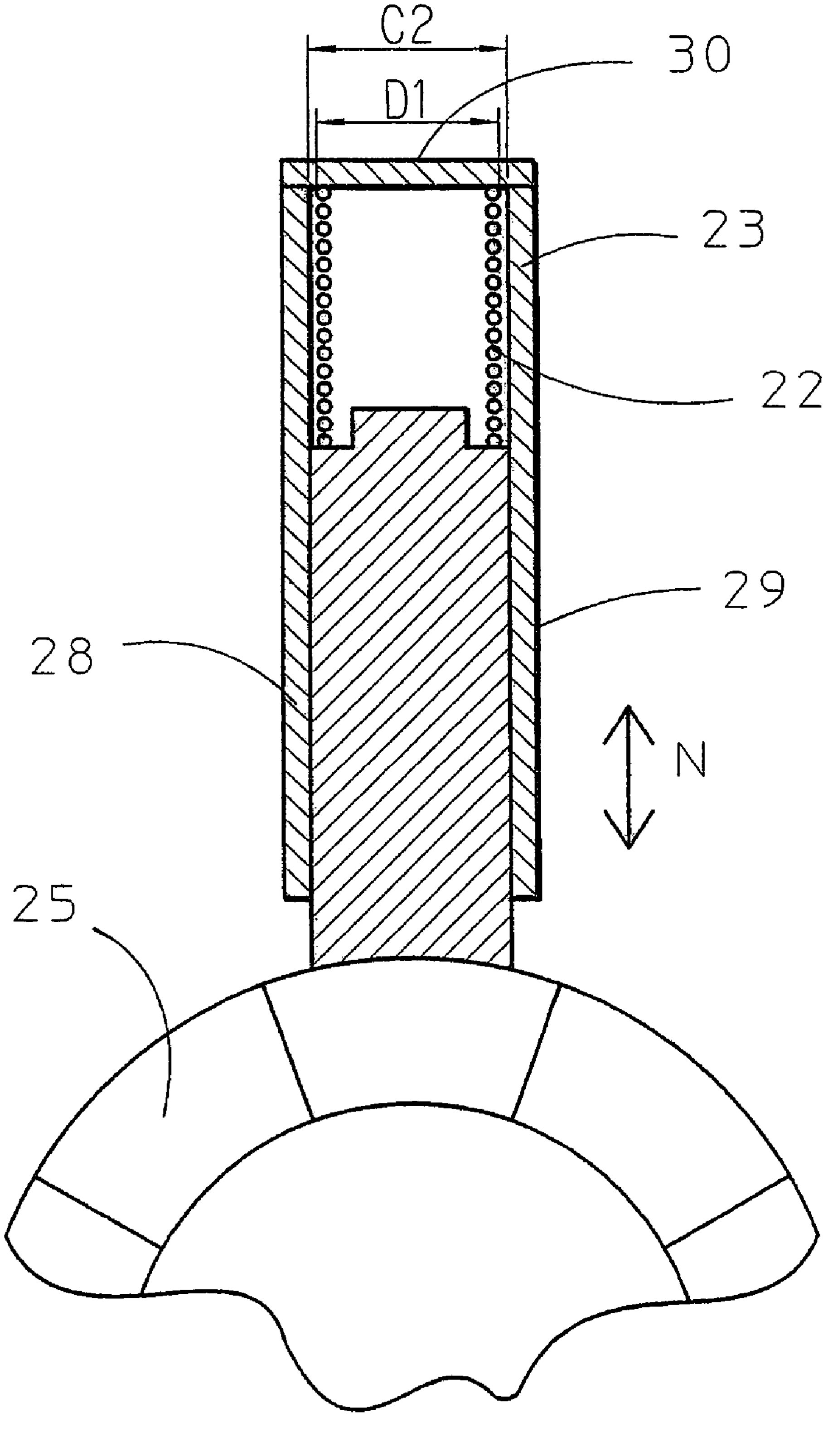
FIG. 17 is a sectional front view of the spring urging device shown in FIG. 16.

As shown in FIG. 16, a distance C1 between an axial side plate 26 of the brush holder 23 and a side surface 27 of the bracket 24 is set about 1.5 to 2 times larger than an outer diameter D1 of the coil spring 22, and as show in FIG. 17 a distance C2 between side plates 28 and 29 of the brush holder 23 is set a little larger than the outer diameter D1 of the coil spring 22, so that the coil spring 22 can move freely in an axial direction N of the brush 21.

When the coil spring 22 is compressed, the coil spring 22 is deformed along a S curve, as shown in FIG. 16. In this state, the coil spring 22 is brought into contact with the side pate 26 of the brush holder 23 and the side surface 27 of the bracket 24 at points Q1 and Q2, respectively, and is prevented from being bent by the side plates 28 and 29 of the brush holder 23.

In the state shown in FIG. 16, the brush 21 is forced by a load Fa and brought into contact with the commutator 25.

In this state, it is assumed that the coil spring 22 is divided into five segments, a first and a fifth segments each having a spring constant k9, a second and a fourth segments each having a spring constant k10, and a third segment having a spring constant kill, for example. The total spring constant ke of the coil spring 22 can be expressed equivalently by a following formula.

$$1/ke=2/k9+2/k10+1/k11$$

Figure 18:
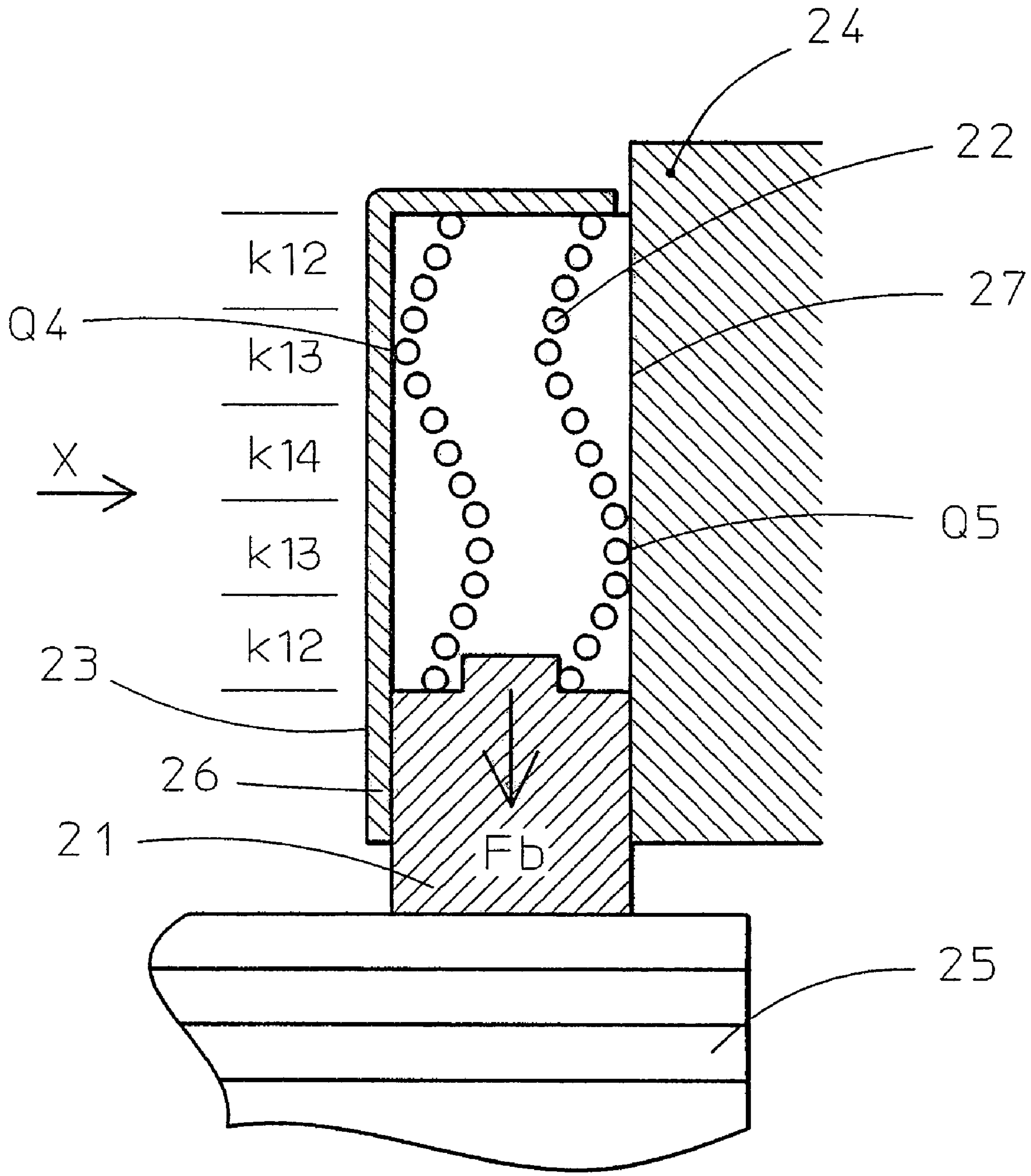
FIG. 18 is a sectional side view of the spring urging device when an effective portion of a brush has been worn away.

FIG. 18 is a sectional side view showing relations in position between the brush 21, the coil spring 22, the brush holder 23, the bracket 24 and the commutator 25. An effective length of the brush 21 is reduced according to the use.

Figure 19:
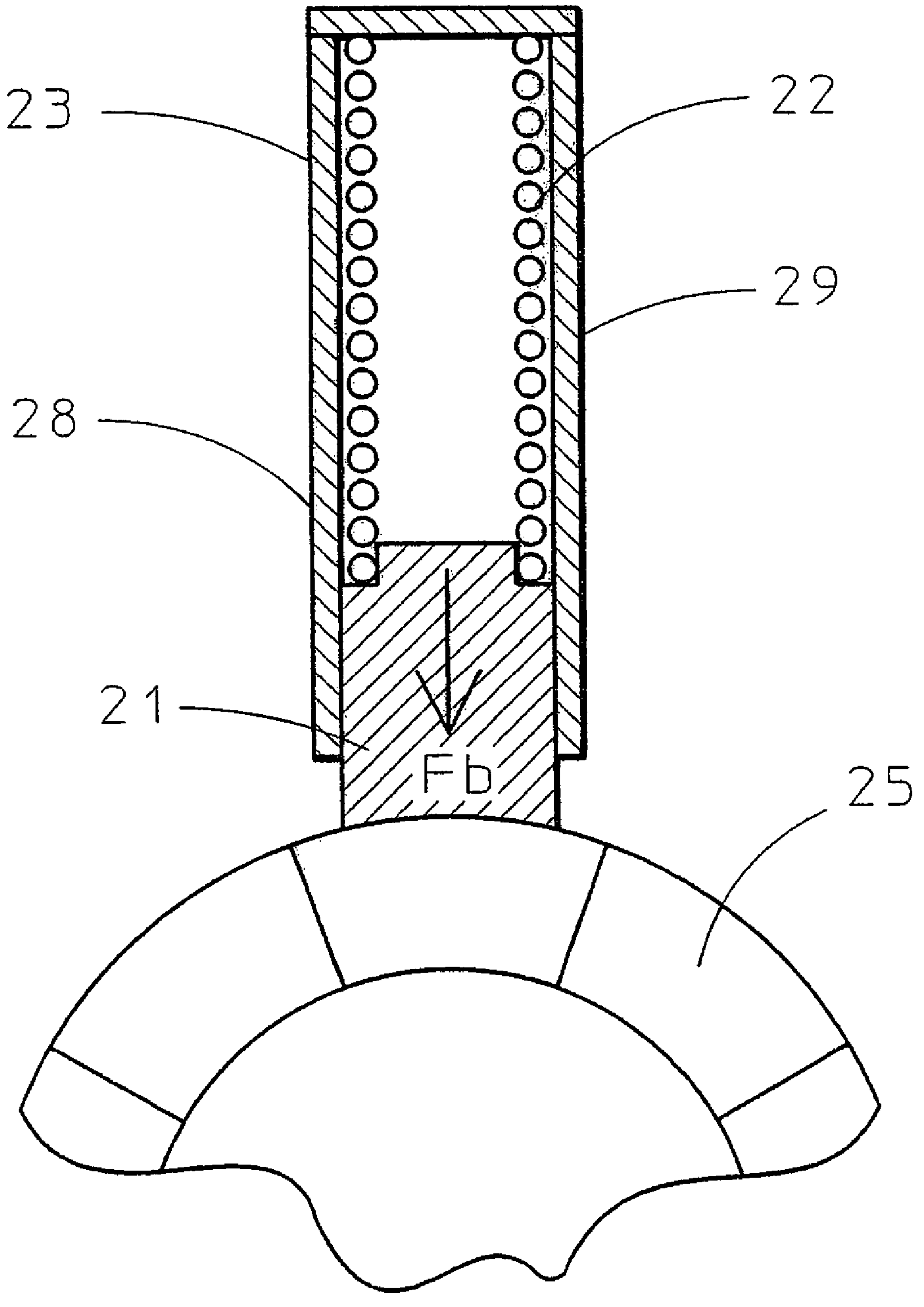
FIG. 19 is a sectional front view of the spring urging device shown in FIG. 18.

FIG. 19 is a cross sectional view of the non-linear spring device shown in FIG. 18 viewed in a direction of an arrow X. As shown in FIG. 18 and FIG. 19, the effective length of the brush 21 is reduced due to the abrasion. Accordingly, the coil spring 22 is deformed along a slow S curve and brought into contact with the side plate 26 of the brush holder 23 at a point Q4 and with the side surface 27 of the bracket 24 at a point Q5, respectively, under a small contact pressure, as shown in FIG. 18. Further, the coil spring 22 is brought into contact with the side plates 28 and 29 of the brush holder 23 under a small contact pressure, as shown in FIG. 19.

In the state shown in FIG. 18, the coil spring 22 is deformed along the slow S curve. As a result, the brush 21 is forced by a load Fb and brought into contact with the commutator 25.

In this state, it is assumed that the coil spring 22 is divided into five segments, a first and a fifth segments each having a spring constant k12, a second and a fourth segments each having a spring constant k13, and a third segment having a spring constant k14, for example. The total spring constant kf of the coil spring 22 can be expressed equivalently by a following formula.

$$1/kf=2/k12+2/k13+1/k14$$

As stated above, the total spring constant of the coil spring is varied contagiously from the start of the small DC motor to a state that the effective length of the brush becomes to zero due to the abrasion, so that the spring device having the non-linear spring property for urging the brush can be obtained.

The relation between the distortion of the coil spring for urging the brush and the load applied to the brush becomes to a curve similar to the curve H shown in FIG. 14.

The optimum value of the pressure to be applied to the brush of the small DC motor is changed according to the quality of the brush, size, kind or purpose of the motor, and cannot be specified. However, a pressure of about 140~350 $g/cm^2$ is preferable for the DC motor or the DC generator for use in the general industry, a pressure of about 200~600 g/cm$^2$ is preferable for the DC motor for use in the domestic electrification equipments or for the DC motor of small capacity, and a pressure of about 400~800 g/cm$^2$ is preferable for the DC motor for use in the car.

Figure 20:
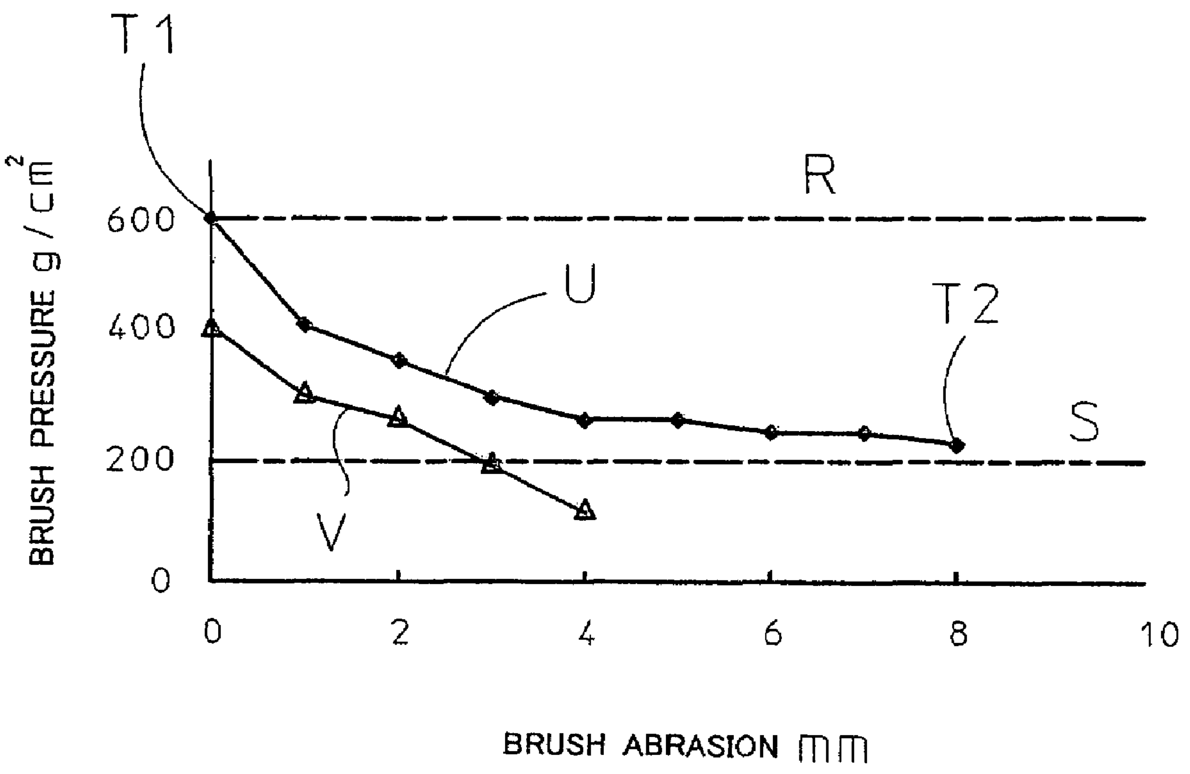
FIG. 20 is a graph showing a relation between the abrasion of the brush and the pressure applied to the brush.

A curve U shown in FIG. 20 shows a relation between the abrasion of the brush and the pressure applied to the brush of the small DC motor according to the present invention. As shown in FIG. 20, at a point T1 corresponding to the initial operation stage of the small DC motor shown in FIG. 16, the brush pressure is 600 g/cm$^2$ and the length of the brush abrasion is zero mm, and at a point T2 corresponding to the final operation stage of the small DC motor shown in FIG. 18 the brush pressure is 235 g/cm$^2$ and the length of the brush abrasion is 8 mm.

In FIG. 20, horizontal lines R and S define a desirable range of the load to be applied to the brush in the small DC motor of the present invention. A range of from the brush abrasion of 4 mm to the brush abrasion of 8 mm is preferable because the brush pressure change is small.

A curve V shown in FIG. 20 shows a relation between the abrasion of the brush and the pressure applied to the brush of the conventional small DC motor using the linear coil spring. As apparent from the curve V, the brush pressure is lowered according to the small abrasion of the brush.

When the brush pressure is increased more than the horizontal line R shown in FIG. 20, the brush becomes the mechanical abrasion range. When the brush pressure is decreased less than the horizontal line S shown in FIG. 20, the brush becomes the electric abrasion range where the brush abrasion is increased due to the commutation spark.

As stated above, the effective range of the curve U corresponds to a range of from 0 mm to 8 mm of the brush abrasion, and the most effective range corresponds to a range of from 4 mm to 8 mm of the brush abrasion.

On the contrary, in the conventional small DC motor, a range of the curve V corresponding to 4 mm to 8 mm of the brush abrasion becomes the electric abrasion range and the commutation spark range.

According to the present invention, the brush type small DC motor of long service life can be obtained by constructing the brush urging device having an ideal non-linear spring property by using a brush holder, a bracket, a brush and a coil spring having a linear spring property.

According to the present invention, the brush urging device having the non-linear spring property is used for urging the brush in the brush type small DC motor, so that the substantially constant load property can be obtained. Thus, the small DC motor of the present invention is prevented from being operated in the commutation spark range, and the service life thereof can be prolonged.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention. The scope of the present invention should be defined by the terms of the claims appended hereto.

What is claimed is:

1. A spring device comprising:

a coil spring case formed of right, left, back and front side plates and a spring receiving plate, a linear coil spring, and a spring urging member inserted into the coil spring case through an opening of said coil spring case for compressing the coil spring in said coil spring case so that the coil spring is deformed along a S curve and is brought into contact with the back and front side plates of said coil spring case at curved portions thereof, when the spring is compressed, a distance between the right and left side plates of the coil spring case being set larger than an outer diameter of the coil spring, and a distance between the back and front side plates of the spring case being set about 1.5 to 2 times larger than the diameter of the coil spring when said coil spring is not compressed.

* * * * *